United States Patent [19]

Kissa

[11] 4,063,889

[45] Dec. 20, 1977

[54] HALOSOLVENT DYEING PROCESS FOR POLYESTER WITH CATIONIC DYES HAVING SULFOSUCCINATE ANIONS

[75] Inventor: Erik Kissa, Wilmington, Del.

[73] Assignee: E. I. Du Pont de Nemours and Company, Wilmington, Del.

[21] Appl. No.: 634,437

[22] Filed: Nov. 24, 1975

[51] Int. Cl.$^2$ .............................................. D06P 5/00
[52] U.S. Cl. .................................. 8/168 C; 8/89 R; 8/173; 8/177 AB
[58] Field of Search ............ 8/168 C, 89, 173, 177 AB

[56] References Cited

U.S. PATENT DOCUMENTS

| 3,660,008 | 5/1972 | Kissa | 8/168 |
|---|---|---|---|
| 3,718,428 | 3/1973 | Streck | 8/173 |

FOREIGN PATENT DOCUMENTS

| 633,122 | 12/1961 | Canada | 8/92 |
|---|---|---|---|
| 1,192,984 | 5/1970 | United Kingdom. | |
| 1,241,143 | 7/1971 | United Kingdom. | |

*Primary Examiner*—William E. Schulz

[57] ABSTRACT

In an exhaustion process for dyeing unmodified or acid-modified polyester fibers, the fibers are introduced into a dye bath comprising a chlorinated hydrocarbon solvent, a water-insoluble salt of a cationic dye and a $C_{6-13}$alkyl sulfosuccinate anion, from 0.05 to 1.0% based on the total weight of the dyebath of at least one low molecular weight carboxylic acid, a solvent-soluble quaternary ammonium salt of an arylsulfonic acid and optionally additional processing assistants, after which the cationic dye salt is exhausted onto the unmodified or acid-modified polyester by heating the dyebath at a temperature of from 110° to 170° C for from 0.5 to 3 hours, with the proviso that, in the case of the acid-modified polyester fibers, from 0.01 to 0.10% based on the total weight of the dyebath of water must also be present in the dyebath. Good to excellent penetration of and buildup on the polyester fibers are obtained.

14 Claims, No Drawings

HALOSOLVENT DYEING PROCESS FOR POLYESTER WITH CATIONIC DYES HAVING SULFOSUCCINATE ANIONS

BACKGROUND OF THE INVENTION

Dyeing from organic solvents by the exhaust process is regarded as particularly significant, because the process involves chemically simple systems of great economic importance.

In view of the increasing importance of synthetic fibers, particularly polyester fibers, and the possibility of dyeing with homogeneous organic liquors without the addition of water, a great deal of attention has been concentrated on the dyeing of polyester with disperse dyes from organic solvents. Most of the effort appears to be directed toward the development of dyes which can be applied to polyester from organic solvents having a much lower heat of vaporization than water so that the solvent can be recovered by distillation at an acceptable cost. Almost all of the work is being done with nonpolar solvents, such as perchloroethylene. However, thus far only a few disperse dyestuffs have been found which provide a useful color yield when dyed on polyester from perchloroethylene.

Furthermore, polyester (e.g., "Dacron" 54) is not dyeable with cationic dyestuffs in the form of their conventional water-soluble salts unless the fiber is further modified by the introduction of anionic dyesites, e.g., by copolymerization with bis(2-hydroxyethyl)-5-sulfoisophthalate as described in U.S. Pat. No. 3,018,272. It has also been generally recognized that conventional water-soluble cationic dyes tend to be too insoluble in nonpolar solvents, such as perchloroethylene, to have any practical solvent dyeing utility on polyester fibers. For example, the affinity of such cationic dyestuffs for acid-modified polyester when applied from an organic solvent is very low and only very pale shades can be obtained.

It has recently been shown in U.S. Pat. No. 3,660,008 that both unmodified and acid-modified polyester can be dyed with aqueous dispersions of cationic dyes containing counterions derived from strong organic acids, such as electronegatively substituted arylsulfonic acids, by a conventional Thermosol process. However, attempts to dye unmodified polyester by an aqueous exhaust process with these same cationic dye arylsulfonates produces only pastel shades, apparently because of the dissociation and excessive solubility of the dye complex in the aqueous dyebath.

U.S. Pat. No. 3,765,835 discloses the aqueous exhaust dyeing of acid-modified poly(ethylene terephthalate) with aqueous dispersions of cationic dye-arylsulfonate salts.

German OLS 2,010,093 discloses a process for dyeing unmodified polyester in a halogenated organic solvent with cationic dyes in the presence of a solubilizing agent and a dyeing accelerator (i.e., a carrier). In an example, polyester fibers are dyed with a basic blue dye by an exhaust process, the dyebath containing sodium thiocyanate, ethanol and perchloroethylene.

U.S. Pat. No. 3,771,956 discloses a low temperature (90° C) dyeing process for acrylic fibers which employs a dyebath containing a chlorinated hydrocarbon, a basic dyestuff, a nonionic surfactant and water.

U.S. Pat. No. 3,718,428 discloses dyestuff compositions for acrylic fibers containing a preformed water-soluble complex of a cationic dye with a linear $C_{8-24}$ alkylarylsulfonic acid, a lower alcoholic solvent, and alkalizing agent and water.

British Pat. No. 1,333,949 discloses a process for dyeing poly(ethylene terephthalate) with a solution or dispersion of a water-insoluble anthraquinone disperse dyestuff in a halogenated hydrocarbon in the presence of 0.2% to 5% of water based on the volume of the halogenated hydrocarbon at a temperature above the boiling point of the azeotrope of the halogenated hydrocarbon and the water, and at a pressure above atmospheric pressure.

British Pat. No. 1,241,143 discloses stable, concentrated basic dye solutions for anionic modified aromatic polyesters containing the basic dyes as their free bases or as salts of monobasic organic acids having from 4 to 30 carbon atoms and additionally a chlorinated hydrocarbon solvent and a monobasic organic acid of from 4 to 30 carbon atoms. Monobasic organic acids having utility in the reference dye solutions include both aliphatic and aromatic acids, which can contain either a carboxylic or sulfonic acid group.

British Pat. No. 1,234,727 discloses an exhaustion process for dyeing anionic group-containing synthetic fibers with basic dyestuffs in a chlorohydrocarbon solution which contains the basic dyestuff in the form of the chlorohydrocarbon soluble base or chlorohydrocarbon soluble salt or adduct of the dye base, and contains at least one amine, amide and/or amine oxide having at least 12 carbon atoms and from 0.1 to 4% by weight of water based on the weight of the chlorohydrocarbon.

British Pat. No. 1,192,984 discloses an exhaustion process for dyeing natural or synthetic fibers including polyester fibers from a dyebath containing an organic liquid immiscible with water, a surface-active dispersing agent and, dispersed in the organic liquid, an aqueous solution or dispersion of a dyestuff insoluble in or at most sparingly soluble in the organic liquid, the water content of the dyebath being not more than 10% by weight and preferably 0.5 to 3% by weight.

K. Gebert, *Journal of the Society of Dyers and Colorists*, Vol. 87, 509–13 (1971), entitled "The Dyeing of Polyester Textile Fabric in Perchloroethylene by the Exhaust Method", discusses the exhaust dyeing of polyester materials in perchloroethylene with conventional nonionic disperse dyes.

SUMMARY OF THE INVENTION

This invention provides an exhaustion process for dyeing unmodified or acid-modified polyester fibers comprising:

A. introducing said fibers into a dyebath containing:
1. a chlorinated hydrocarbon solvent, with the proviso that in the case of the acid-modified polyester fibers from 0.01 to 0.10% based on the total weight of the dyebath of water must also be present,
2. from 0.01 to 1% based on the total weight of the dyebath of a water-insoluble salt of a cationic dye and an alkyl sulfosuccinate anion of the formula

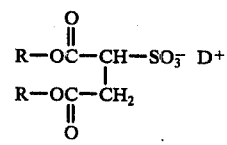

wherein $D^+$ is a cationic chromophore having a resonating or delocalized positive charge and R is an alkyl radical containing from 6 to 13 carbon atoms, 3. from 0.05 to 1.0% based on the total weight of the dyebath of at least one low-molecular weight carboxylic acid, 4. 1 to 1.5 moles per mole of water-insoluble sulfosuccinate salt (2) of a solvent-soluble quaternary ammonium salt of an arylsulfonic acid of the formula

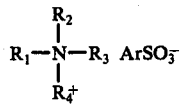

wherein $R_1$ and $R_2$ are alkyl; $R_3$ and $R_4$ are alkyl or benzyl; or $R_3$ and $R_4$ together form a heterocyclic ring containing the nitrogen atom; or $R_2$, $R_3$ and $R_4$ together form a pyridinium ring; and wherein the R groups contain a total of from 12 to 40 carbon atoms and Ar is an aryl group substituted with from 1 to 3 substituents selected from the group consisting of H, Cl, Br, $NO_2$, $C_{1-4}$alkyl, $C_{1-4}$alkoxy, $CO_2C_{1-4}$-alkyl, $CO_2C_2H_4OH$ and $COCH_3$, and (5) optionally, additional processing assistants, and B. maintaining the fibers in the dyebath at a temperature of from 110° to 170° C for from 0.5 to 3 hours;

C. removing excess liquor from the dyed fibers; and

D. drying the dyed fibers.

DESCRIPTION OF THE INVENTION

This invention comprises an exhaustion process for the dyeing, with cationic dyestuffs, of unmodified or acidmodified polyester, which is characterized in that the dyeing is carried out in a chlorohydrocarbon solution containing the dyestuff in the form of an alkyl sulfosuccinate salt, and containing from 0.05 to 1.0% based on the total weight of the dyebath of at least one low-molecular weight organic carboxylic acid, a solvent-soluble quaternary ammonium salt of an arylsulfonic acid, optionally other processing assistants, and in the case of acid-modified polyester from 0.01 to 0.10% based on the total weight of the dyebath of water.

Acid-modified polyester fibers, i.e., poly(ethylene terephthalate) fibers containing metal-sulfonate groups, are disclosed in U.S. Pat. No. 3,018,272. Unmodified polyesters include poly(ethylene terephthalate), polycyclohexane-dimethylene terephthalate, heterogeneous polyesters of terephthalic acid, isophthalic acid and ethylene glycol or of terephthalic acid, sulfoisophthalic acid and ethylene glycol and copolyetherester fibers from p-hydroxybenzoic acid, terephthalic acid and ethylene glycol.

The chlorinated hydrocarbons useful for the process are, for example, aliphatic chlorinated hydrocarbons such as 1,1-dichloroethane, 1,2-dichloroethane, 1,1,1-trichloroethane, 1,1,2-trichloroethane, 1,1,1,2-tetrachloroethane, 1,1,2,2-tetrachloroethane, pentachloroethane, 1-chloropropane, 1,2-dichloropropane, 1,1,1-trichloropropane, 1-chlorobutane, 2-chlorobutane, 1,4-dichlorobutane, 1-chloro-2-methylpropane or 2-chloro-2-methylpropane, and aromatic hydrocarbon chlorides such as chlorobenzene, dichlorobenzene and chlorotoluene. Tetrachloroethylene has proven to be especially satisfactory.

The cationic dyes with a delocalized, resonating, positive charge that are operable as the cationic component of the dye compositions employed in the process of this invention encompass a wide variety of dyes distinguished by the fact that their positive charge is not localized on a single atom, but rather is delocalized through resonance between various atoms of the dye structure. In other words, any cationic basic dye having adjacent atoms containing either an unshared pair of electrons or a pair of electrons available for delocalization as the pi ($\pi$) electrons which form multiple or aromatic bonds is covered by the definition.

The following dye structures are illustrative of the wide variety of resonating dye chromophores which are suitable for reaction with alkyl sulfosuccinic acids to form the water-insoluble dye salts employed in the process of this invention.

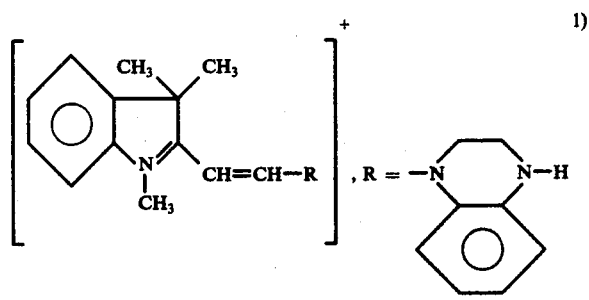

This dye is disclosed in U.S. Pat. No. 3,597,424.

2. The dye of formula 1 wherein R is

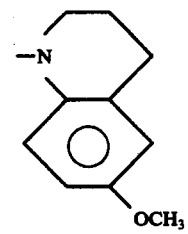

3. The dye of formula 1 wherein R is

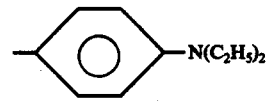

This dye is disclosed in U.S. Pat. Nos. 2,164,793 and 2,734,901.

4. The dye of formula 1 wherein R is

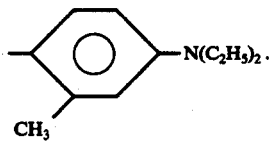

This dye is disclosed in the patents mentioned under 3 above.

5. The dye of formula 1 wherein R is

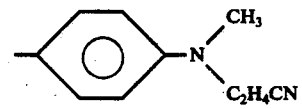

This dye is disclosed in the patents mentioned under 3 above.

6. The dye of formula 1 wherein R is

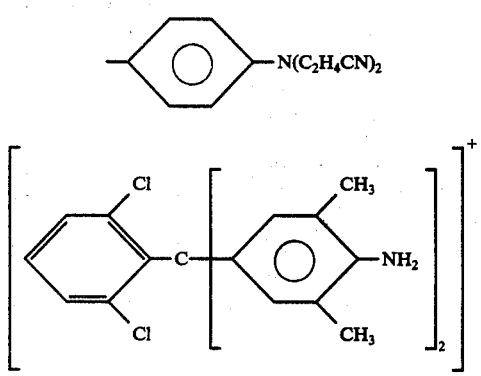

7)

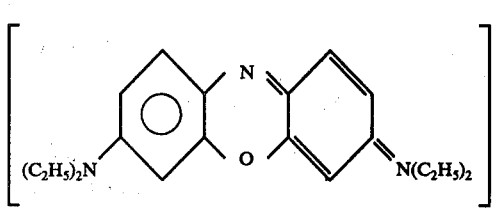

8)

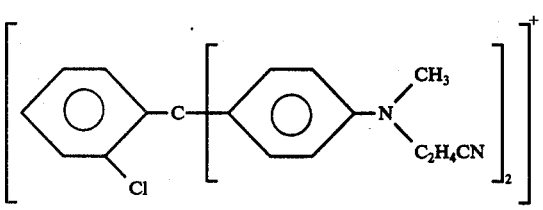

9)

This dye is disclosed in U.S. Pat. No. 3,021,344.

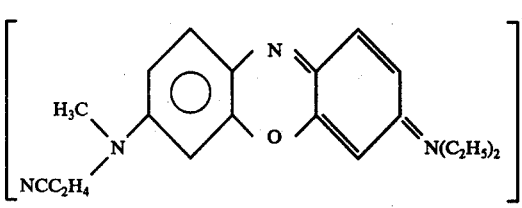

10)

This dye is disclosed in U.S. Pat. No. 2,741,605.

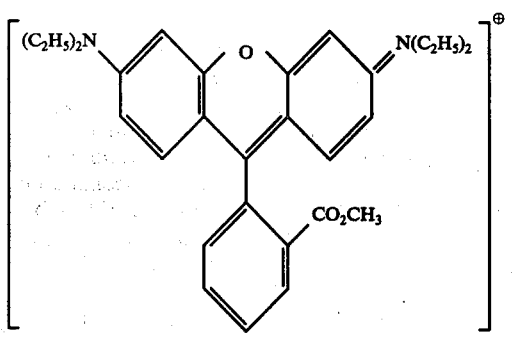

11)

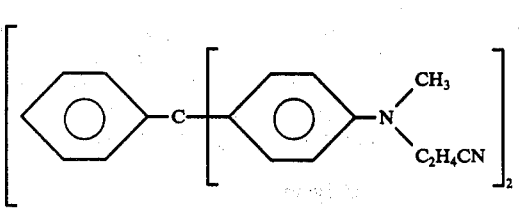

12)

Disclosed in U.S. Pat. No. 2,083,888.

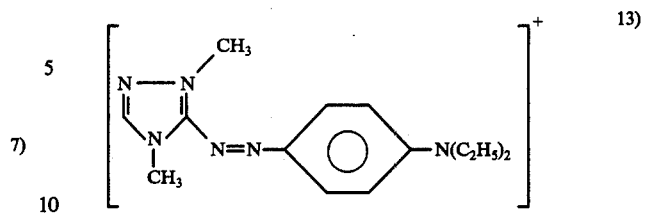

13)

This dye is disclosed in U.S. Pat. No. 2,883,373.

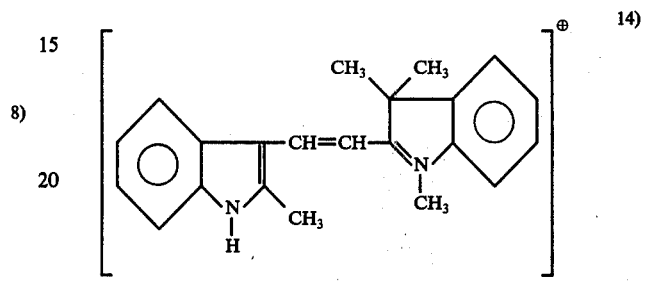

14)

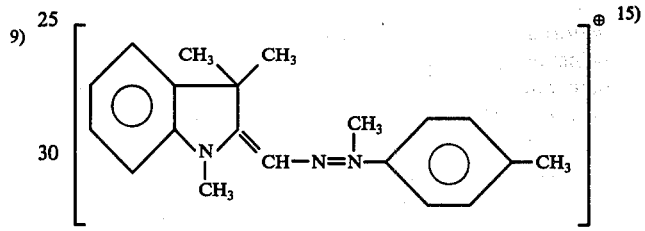

15)

This dye is disclosed in Canadian Pat. No. 647,876.

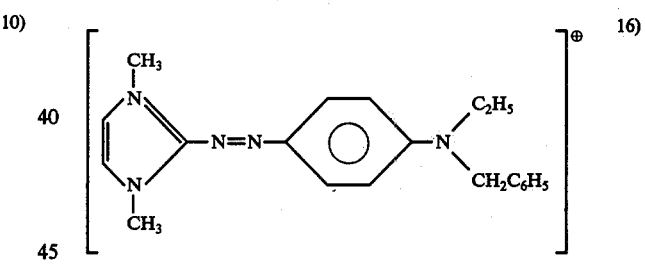

16)

This dye is related to the dyes disclosed in U.S. Pat. No. 3,173,907.

The above list should not be construed as being restrictive. Indeed, it is believed that all of the resonating cationic dyes disclosed herein and in coassigned U.S. Pat. No. 3,660,008 (the disclosure of which is specifically incorporated by reference herein) will have similar utility in the subject dyeing process when used in the form of their sulfosuccinate salts as will be hereinafter described.

The cationic dyes mentioned above are most commonly taught in the patent literature as possessing adequate water solubility. Water solubility is achieved by preparing the dye as salts with anions selected from the following group: Cl$^-$, Br$^-$, HSO$_4^-$, H$_2$PO$_4^-$, 1/2SO$_4^=$, ZnCl$_3^-$, CH$_3$SO$_4^-$, HCOO$^-$, CH$_3$COO$^-$ and the like. Cationic dyes derived from the aforementioned water-solubilizing anions when employed in the process of this invention do not diffuse readily into the polyester fiber, and only pale shades are obtained thereon.

In the present invention, alkyl sulfosuccinates having from 6 to 13 carbon atoms in the alkyl group are employed in place of the water-solubilizing anions mentioned above. Such anions include the following: bis(2-ethylhexyl)sulfosuccinate, di(tridecyl)sulfosuccinate, di(dodecyl)sulfosuccinate, dihexylsulfosuccinate and the like. The aliphatic groups (the R's) in a single compound need not be the same but, for the sake of convenience and economy, generally are.

The preparation of the cationic dye-sulfosuccinate salts of this invention is carried out by initially preparing an aqueous solution or slurry of the cationic dye associated with its customary, water-solubilizing anion, and precipitating the cationic dye as the water-insoluble cationic dye-sulfosuccinate by the addition of a slight excess of a molar equivalent of the appropriate selected alkyl sulfosuccinate, usually as its sodium or potassium salt. The dye salt is then filtered, washed thoroughly with water and dried. The preparative procedure is similar to that described in U.S. Pat. No. 3,660,008.

In the above manner, yields of cationic dye-sulfosuccinate salts of greater than 80% can be obtained, frequently yields of greater than 90% are obtainable. The stoichiometry of the cationic dye-sulfosuccinate salt is as would be expected to balance the electrical charges, i.e., 1:1.

Alternatively, the aqueous solution or slurry of water-insoluble sulfosuccinate salt can be extracted with a water-immiscible organic solvent, e.g., chloroform. The chloroform phase containing the sulfosuccinate salt is then used directly in the subject dyeing process. A measured volume (1 to 10 ml.) of the chloroform solution is spread out on the walls of the dyeing apparatus and evaporated to dryness before adding the chlorinated hydrocarbon solvent. This alternative procedure has the advantage that the sulfosuccinate salt can be readily isolated even when it forms a tarry substance in water.

Cationic dye salts derived from the aforementioned alkyl sulfosuccinate anions are very soluble in organic solvents, such as perchloroethylene, but their absorption into polyester fiber is poor when applied from such solvents. Selected solvent-soluble quaternary ammonium arylsulfonates having the formula

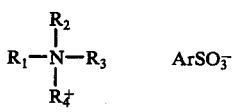

wherein $R_1$ and $R_2$ are alkyl; $R_3$ and $R_4$ are alkyl or benzyl; or $R_3$ and $R_4$ together form a heterocyclic ring containing the nitrogen atom; or $R_2$, $R_3$ and $R_4$ together form a pyridinium ring; and wherein the R groups contain a total of from 12 to 40 carbon atoms and Ar is an aryl group substituted with from 1 to 3 substituents selected from the group consisting of H, Cl, Br, $NO_2$, $C_{1-4}$alkyl, $C_{1-4}$alkoxy, $CO_2C_{1-4}$alkyl, $CO_2C_2H_4OH$ and $COCH_3$, when added to the dyebath convert the cationic dye-sulfosuccinate salt by an ion exchange mechanism into a species capable of diffusing into the polyester fiber while the dyebath remains essentially homogeneous. Medium to heavy shade depths are readily obtained on polyester fibers. The diffusion rate depends upon the structures of the quaternary ammonium cation and the specific arylsulfonate anion of the added salt, the solvent, other dyebath constituents, the concentration of the quaternary ammonium arylsulfonate salt in the dyebath and the temperature of dyeing as will be exemplified hereinafter.

Specific quaternary ammonium cations having utility in the invention process contain a total of from 12 to 40 carbon atoms and are exemplified in Table I.

TABLE I tetra-n-butylammonium
trimethylhexadecylammonium
stearyl($C_{18}$)dimethylbenzylammonium
cetyl($C_{16}$)trimethylammonium
cetyl($C_{16}$)dimethylbenzylammonium
lauryl($C_{12}$)trimethylammonium
stearyl($C_{18}$)trimethylammonium
oleyltrimethylammonium
dibenzyldimethylammonium
methyltri-n-butylammonium
cetyl($C_{16}$)pyridinium
myristyl($C_{14}$)trimethylammonium    dimethyldistearylammonium
N-cetyl($C_{16}$)-N-ethylmorpholinium
didecyldimethylammonium Suitable arylsulfonate anions employed in the formation of the quaternary ammonium arylsulfonate salts are given in Table II.

TABLE II benzenesulfonate
o-,p-nitrobenzenesulfonate
o-,p-bromobenzenesulfonate
o-,p-chlorobenzenesulfonate
o-,p-methylbenzenesulfonate
o-t-butylbenzenesulfonate
2,5-dimethylbenzenesulfonate
4-chloro-3-methylbenzenesulfonate
2,4-dinitrobenzenesulfonate
2-chloro-3,5-dinitrobenzenesulfonate
dimethyl 5-sulfoisophthalate
3-hydroxyethoxycarbonylbenzenesulfonate
bis(2-hydroxyethyl)-5-sulfoisophthalate
4-methoxycarbonylbenzenesulfonate
4-acetylbenzenesulfonate
4-methoxybenzenesulfonate
2,5-dichlorobenzenesulfonate
2,4,6-trimethylbenzenesulfonate
4-nitro-3-methylbenzenesulfonate
2-nitro-4,5-dimethoxybenzenesulfonate
2,6-dimethylbenzenesulfonate
2-chloro-5-nitrobenzenesulfonate
5-nitro-2-methylbenzenesulfonate The process of this invention can be conveniently carried out by immersing the polyester textile material in a solution of the cationic dye-sulfosuccinate salt in the chlorinated hydrocarbon solvent containing the required amount of a low molecular weight carboxylic acid, the quaternary ammonium arylsulfonate salt and optionally additional processing assistants, heating the dyebath to 110° C to 170° C and keeping it at this temperature until the dyebath is exhausted; this is generally the case after 0.5 to 3 hours. The dyeing may be achieved under normal pressure or in a suitable vessel under a pressure higher than atmospheric pressure.

The lengths of treatment are not critical and may be selected within broad limits, according to the nature of the polyester fibers and the cationic dye-sulfosuccinate dyestuffs.

The selection of dyeing temperature depends mainly upon the boiling point of the solvent and may vary in some proportion with regard to the pressure conditions. It is preferred that the dyeing temperature be equal to or greater than the boiling point of the pure halogenated hydrocarbon in order to obtain maximum exhaustion of the dyebath and depth of shade on the fiber. Temperatures above 170° C are to be avoided, since decomposition of the cationic dye salts and altering of the fiber esthetics are liable to occur. When using organic solvents having boiling points below 110° C at 1 atmosphere pressure, dyeing in a pressure vessel is required to ensure optimum exhaustion of the bath and depth of shade on the fiber.

The amount of cationic dye-sulfosuccinate salt employed can vary within wide limits depending on the depth of the shade that is desired. In general, amounts from 0.01% to 1% by weight based on the total weight of the dyebath have been found satisfactory.

The addition of carboxylic acids to the dyebath is dictated by the solubility of the particular cationic dyearylsulfonate salt employed in the process. Small amounts, i.e., from 0.05 to 1% by weight (preferably 0.05 to 0.2%) of carboxylic acids have been found to markedly enhance absorption of cationic dye arylsulfonate salts which are inadequately soluble in the chlorinated hydrocarbon solvent. Amounts of carboxylic acid in excess of 1% increase the solubility of the cationic dye salt in the dyebath and dye absorption on the fiber decreases. Carboxylic acids having utility in the subject exhaustion process include aliphatic, cycloaliphatic and aromatic monobasic carboxylic acids containing from 1 to 15 carbon atoms. Carboxylic acids which have been found to be particularly suitable include aliphatic acids, such as formic, acetic, propionic, ethoxyacetic, 2-chloropropionic, 3-chloropropionic and neodecanoic; cycloaliphatic acids such as cyclohexane carboxylic acid; and aromatic carboxylic acids such as benzoic acid, 4-nitrobenzoic acid, 4-ethoxybenzoic acid and 2,4-dichlorobenzoic acid. Among the acids mentioned, acetic acid excels in the practice of the invention.

The amount of quaternary ammonium arylsulfonate salt added to the dyebath is important. The optimum conditions require at least a molar amount and up to a 50% molar excess of the quaternary ammonium arylsulfonate as compared to the cationic dye-sulfosuccinate salt in order to force ion exchange to the side of the dye associated with the anion provided by the added quaternary ammonium salt.

In some cases, addition of a nonionic surfactant to the dyebath has proven advantageous in order to ensure that the polar constituents are evenly distributed throughout the dyebath. As nonionic surfactants there are particularly used the known surface-active ethoxylation and propoxylation products of fatty alcohols, alkylphenols, fatty acid amides and fatty acids; the surfactants are used in amounts of 0.01 to 0.4% by weight of the total weight of the dyebath.

Furthermore, it has also proved advantageous to add to the dyebath small amounts of a free radical inhibitor, such as 2,6-di-t-butyl-4-methylphenol ("Ionol"), especially in those cases where the cationic dye salts tend to undergo decomposition in the boiling chlorinated hydrocarbon solvent.

The depth of color of the dyeings obtained with a specified proportion of cationic dye salt:goods to be dyed is dependent on the concentration of cationic dye salt in the dyebath and thus depends on the goods-to-liquor ratio. Goods-to-liquor ratios of from 1:10 to 1:40 have been found to be operable in the process. However, short goods-to-liquor ratios, e.g., 1:10, are preferred since more complete dye utilization is obtained.

In the case where acid-modified polyester is dyed by the invention process, small amounts of water, i.e., from 0.01 to 0.10% based on the total weight of the dyebath, must also be present in the dyebath. The presence of the specified amount of water in the dyebath is required to allow for ionic interaction between the cationic dye salt and the ionic sites of the fiber. Indeed, it is only with such an addition that economic color yields can be obtained on acid-modified polyester fibers. Amounts of water in excess of 0.10% are to be avoided since layer formation is likely to occur and dyeing efficiency is correspondingly decreased.

At the conclusion of the process, the dyed polyester material is scoured with a halogenated hydrocarbon solvent or some other solvent such as acetone to remove excess dyebath liquor and/or unfixed dyestuff, and the polyester material is then dried.

By the process of this invention, it is possible to dye both unmodified and acid-modified polyester fibers in bright deep shades and with excellent uniformity from chlorinated hydrocarbon solvents with cationic dyestuffs in the most varied stages of manufacture, e.g., in the form of filaments, flocks, combed materials, yarns, as piece goods such as woven and knitted fabrics or as manufactured articles of wear. The dyeings are distinguished by having good to excellent wash- and crock-fastness.

Examples 1-13, which follow, are directed to the preparation and use of the aforesaid cationic dye-sulfosuccinate salts. Description of a dye by number, e.g., dye 3, in the examples, refers to the cationic dye numbered 3 in the above discussion. All parts are by weight unless otherwise specified.

EXAMPLE 1

The bis(2-ethylhexyl)sulfosuccinate salt of dye 5 having the formula

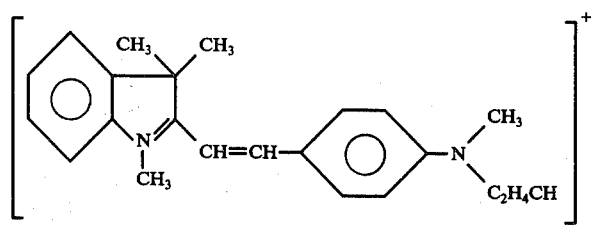

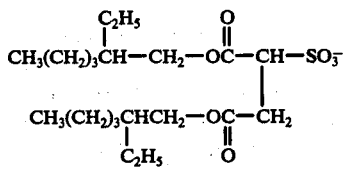

was prepared by dissolving 5 parts of crude dye 5 in 200 ml. of water. Bis(2-ethylhexyl)sulfosuccinate as the sodium salt (2.5 parts) was added over a 30-minute period at room temperature. The pH of the mixture was adjusted to 3 by the addition of dilute sulfuric acid. Chloroform (200 ml.) was added and the mixture was stirred at room temperature for 1 hour. The chloroform layer containing the sulfosuccinate salt was separated and used directly in the subject dyeing process. A 5-ml. aliquot (corresponding to 0.077 part of crude basic dye) was uniformly distributed on the walls of the dyebath by evaporation of the solvent in an air current.

Five parts of a fabric of poly(ethylene terephthalate) fibers were introduced at room temperature into the dyebath containing the above cationic dye-sulfosuccinate salt, 0.2 part of acetic acid, 1 part of "Ionol" (2,6-di-t-butyl-4-methylphenol) free radical inhibitor, 0.13 part of tetra-n-butylammonium p-chlorobenzenesulfonate and 200 ml. of perchloroethylene.

The bath was heated to 120° C over about 15 minutes with vigorous circulation of the liquor, and kept at this temperature for 2 hours. The liquor was then removed and the dyed goods were scoured with acetone to remove any dye adhering to the fiber surface. The fiber was finally dried. An intense red dyeing with good fastness to washing and crocking was obtained.

EXAMPLES 2-7

Table III, immediately following, shows preferred bis(2-ethylhexyl)sulfosuccinate cationic dye salts which can be obtained by the general procedure of Example 1 above.

TABLE III

| Example | Cation | Shade on Polyester |
| --- | --- | --- |
| 2 | dye 10 | Bright blue |
| 3 | dye 8 | Bright blue |
| 4 | dye 7 | Bright blue |
| 5 | dye 2 | Bright yellow |
| 6 | dye 16 | Medium red |
| 7 | dye 12 | Deep green |

The above-mentioned cationic sulfosuccinate dyestuffs were applied to a fabric of textured poly(ethylene terephthalate) (5 parts) by immersion of the fabric in a dyebath containing the aforesaid cationic dyestuffs, 0.20 part of acetic acid, 0.13 part of tetra-n-butylammonium p-chlorobenzenesulfonate and 200 ml. of perchloroethylene and heating of the dyebath at 120° C for 2 hours. After removal of the liquor, scouring and drying, bright uniform dyeings were obtained having the shades specified in Table III.

EXAMPLE 8

The bis(2-ethylhexyl)sulfosuccinate salt of dye 3 having the formula

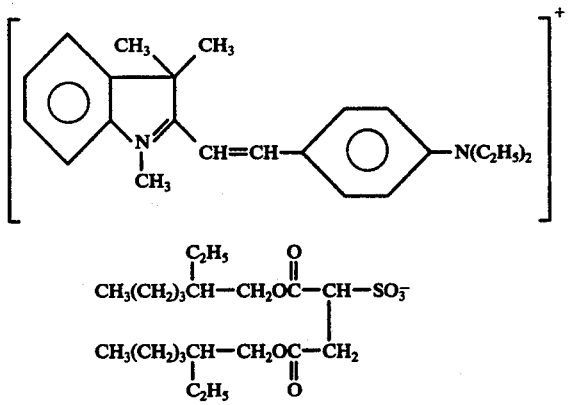

was prepared by dissolving 2.5 parts of crude dye 3 in 100 ml. of water. Bis(2-ethylhexyl)sulfosuccinate as the sodium salt (5 parts) was added over a 30-minute period at room temperature. The pH of the mixture was adjusted to 3 by the addition of dilute sulfuric acid. Chloroform (100 ml.) was added and the mixture was stirred for 1 hour at room temperature. The pH of the aqueous layer was about 3. The chloroform layer containing the sulfosuccinate salt was separated and a 3-ml. aliquot (corresponding to 0.036 part of crude cationic dye) was used in the subsequent dyeing operation.

Five parts of a fabric of poly(ethylene terephthalate) fibers were introduced at room temperature into a dyebath containing the above cationic dye-sulfosuccinate salt, 0.2 part of acetic acid, 0.15 part of trimethylhexadecylammonium p-chlorobenzenesulfonate and 200 ml. of perchloroethylene.

The bath was heated to 120° C within 15 minutes with vigorous circulation of the liquor and kept at this temperature for 2 hours. After removal of the liquor, the dyed goods were scoured with acetone and finally dried. A deep red dyeing having good wash- and crock-fastness was obtained.

EXAMPLE 9

Five parts of poly(ethylene terephthalate) fiber were heated at 120° C for 2 hours, while the liquor was vigorously circulated in a dyebath containing 0.15 part of the sulfosuccinate dye salt of Example 6, 0.20 part of acetic acid, 0.25 part of tetra-n-butylammonium dimethyl-5-sulfoisophthalate and 200 ml. of perchloroethylene.

After removal of the liquor, the dyed fabric was scoured and dried. A deep red dyeing was obtained.

A similar deep red shade dyeing was obtained when the 0.25 part of tetra-n-butylammonium dimethyl 5-sulfoisophthalate was replaced with 0.21 part of tetra-n-butylammonium p-acetylbenzenesulfonate.

EXAMPLE 10

Five parts of texturized poly(ethylene terephthalate) fiber were dyed at 140° C for 2 hours under pressure in an autoclave containing 0.033 part of the dye of Example 8 having the formula

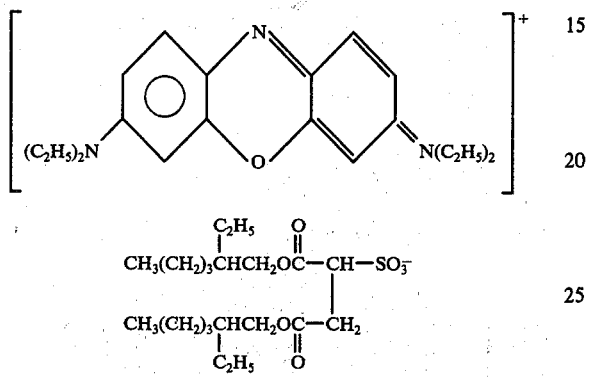

0.4 part of acetic acid, 0.043 part of tetra-n-butyl ammonium p-chlorobenzenesulfonate and 200 ml. of perchloroethylene. After removing the dye liquor, the dyed fabric was scoured and then dried. A deep blue dyeing was obtained.

EXAMPLE 11

The bis(2-ethylhexyl)sulfosuccinate salt of dye 12 when applied to texturized poly(ethylene terephthalate) fiber by the autoclave procedure of Example 10 provided a deep green shade.

EXAMPLE 12

Five parts of acid-modified poly(ethylene terephthalate) fiber were introduced at room temperature into a dyebath containing 0.015 part of the bis(2-ethylhexyl)-sulfosuccinate salt of dye 16, 0.60 part of acetic acid, 0.10 part of water, 0.065 part of tetra-n-butylammonium p-chlorobenzenesulfonate and 200 ml. of perchloroethylene.

The bath was heated at 120° C for 2 hours, while vigorously circulating the liquor. After removing the liquor, the dyed goods were scoured with acetone and finally dried. A light red dyeing was obtained.

EXAMPLE 13

The bis(2-ethylhexyl)sulfosuccinate salt of dye 12 when applied to acid-modified poly(ethylene terephthalate) by the procedure of Example 12 provided a bright green shade.

I claim:
1. An exhaustion process for dyeing unmodified or acid-modified polyester fibers comprising:
    A. introducing the fibers into a dyebath in a goods-to-liquor ratio in the weight range 1:10–1:40, the dyebath comprising:
        1. a chlorinated hydrocarbon solvent, with the proviso that when acid-modified polyester fibers are dyed from 0.01 to 0.10% based on the total weight of the dyebath of water must also be present,
        2. 0.01 to 1.0% based upon the total weight of the dyebath of a water-insoluble salt of a cationic dye and an alkyl sulfosuccinate anion of the formula

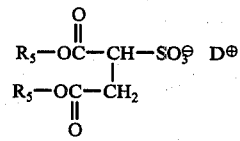

where D+ is a cationic chromophore having a resonating or delocalized positive charge and the $R_5$'s, alike or different, are alkyl radicals containing from 6 to 13 carbon atoms,
        3. 0.05 to 1.0% based on the total weight of the dyebath of at least one low-molecular weight carboxylic acid,
        4. 1 to 1.5 mole of water-insoluble sulfosuccinate salt (2) present of a solvent-soluble quaternary ammonium salt of an arylsulfonic acid of the formula

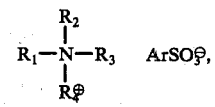

wherein
$R_1$ and $R_2$ are alkyl, $R_3$ and $R_4$ are alkyl or benzyl, or $R_3$ and $R_4$ together form a heterocyclic ring containing the nitrogen atom, or $R_2$, $R_3$ and $R_4$ together form a pyridinium ring, the R groups containing a total of from 12 to 40 carbon atoms; and Ar is an aryl group substituted with from 1 to 3 substituents selected from the group consisting of H, Cl, Br, $NO_2$, $C_{1-4}$alkyl, $C_{1-4}$alkoxy, $CO_2C_2H_4OH$ and $COCH_3$, and
        5. optionally, at least one processing assistant;
    B. maintaining the fibers in the dyebath at a temperature of from 110° to 170° C for from 0.5 to 3 hours;
    C. removing the dyed fibers from the dyebath and any excess liquor from the fibers; and
    D. drying the dyed fibers.

2. The process of claim 1 wherein the polyester is unmodified or acid-modified poly(ethylene terephthalate).

3. The process of claim 1 wherein the chlorinated hydrocarbon solvent is selected from the group consisting of tetrachloroethylene, 1,1-dichloroethane, 1,2-dichloroethane, 1,1,1-trichloroethane, 1,1,2-trichloroethane, 1,1,1,2-tetrachloroethane, 1,1,2,2-tetrachloroethane, pentachloroethane, 1-chloropropane, 1,2-dichloropropane, 1,1,1-trichloropropane, 1-chlorobutane, 2-chlorobutane, 1,4-dichlorobutane, 1-chloro-2-methylpropane or 2-chloro-2-methylpropane, chlorobenzene, dichlorobenzene and chlorotoluene.

4. The process of claim 1 wherein D+ is selected from the group consisting of

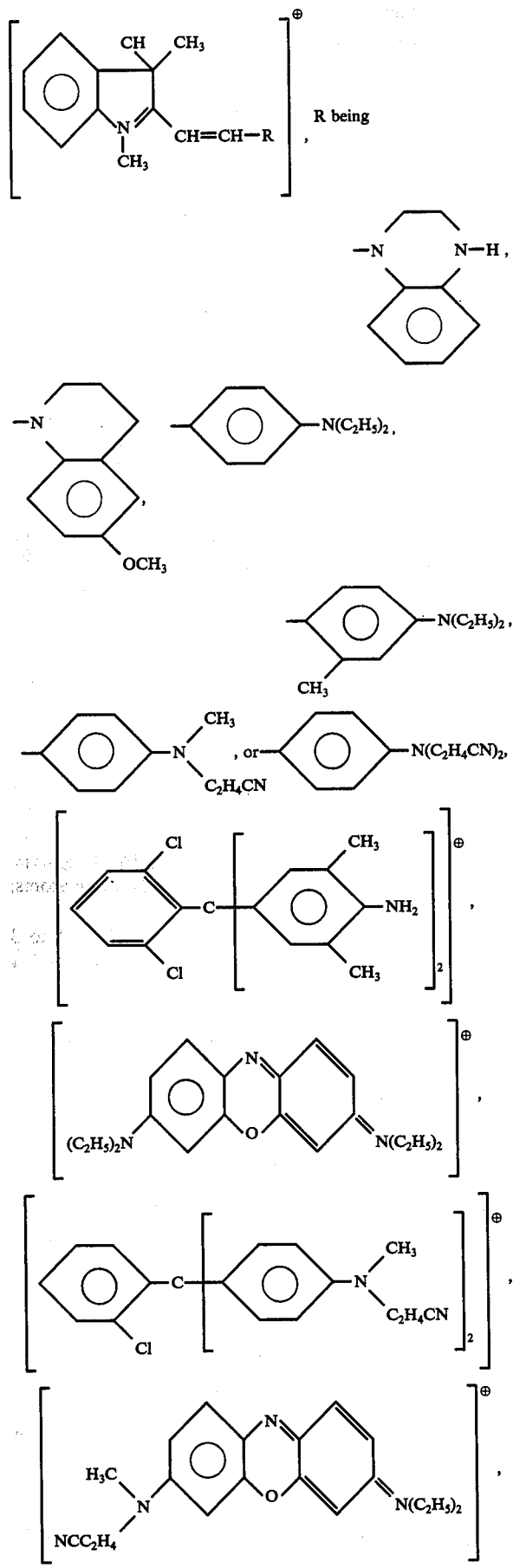
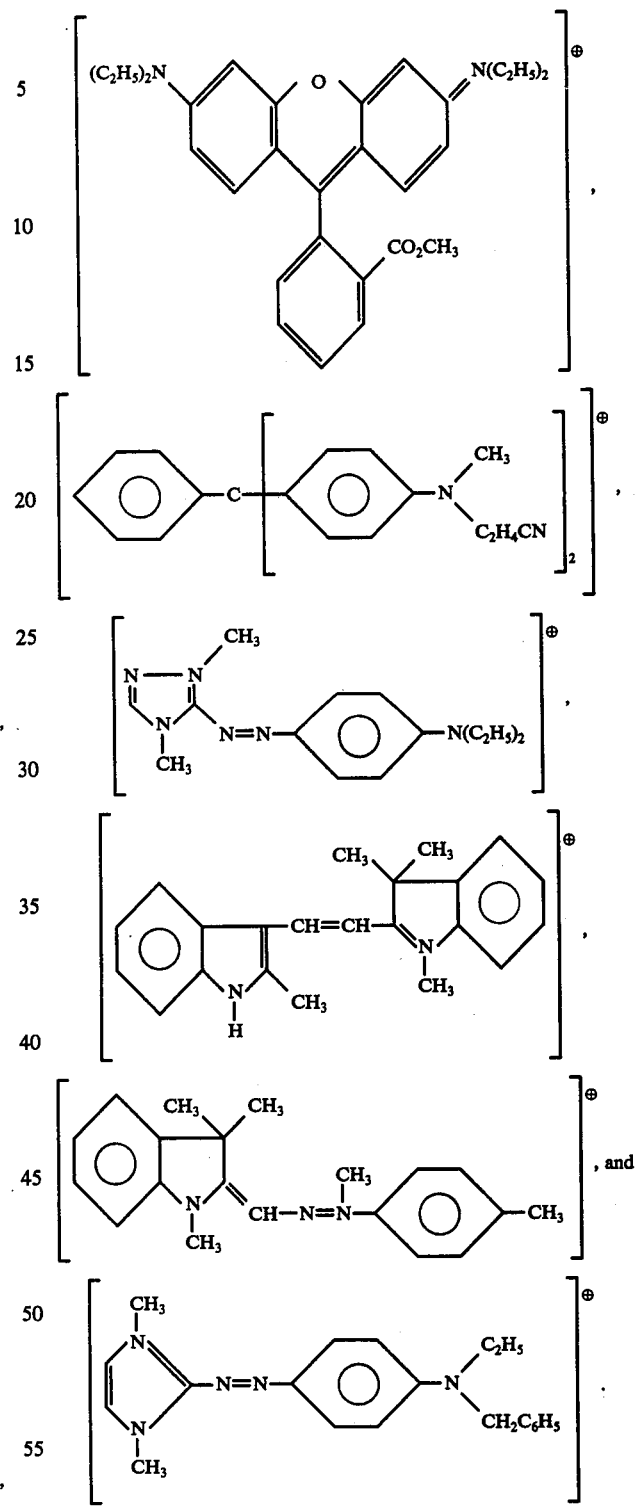

5. The process of claim 1 wherein sulfosuccinate is selected from the group consisting of bis(2-ethylhexyl)sulfosuccinate, di(tridecyl)sulfosuccinate, di(dodecyl)sulfosuccinate and dihexylsulfosuccinate.

6. The process of claim 1 wherein the in carboxylic acid is selected from the group consisting of aliphatic, cycloaliphatic, and aromatic carboxylic acids of 1–15 carbon atoms.

7. The process of claim 6 wherein the carboxylic acid is selected from the group consisting of formic, acetic, 2-chloropropionic, 3-chloropropionic, neodecanoic, cyclohexane carboxylic, benzoic, 4-nitrobenzoic and 2,4-dichlorobenzoic acids.

8. The process of claim 1 wherein quaternary ammonium is selected from the group consisting of tetra-n-butylammonium, trimethylhexadecylammonium, stearyldimethylbenzylammonium, cetyltrimethylammonium, cetyldimethylbenzylammonium, lauryltrimethylammonium, stearyltrimethylammonium, oleyltrimethylammonium, dibenzyldimethylammonium, methyltri-n-butylammonium, cetylpyridinium, myristyltrimethylammonium, dimethyldistearylammonium, N-cetyl-N-ethylmorpholinium, and didecyldimethylammonium.

9. The process of claim 1 wherein $ArSO_3^-$ is selected from the group consisting of benzenesulfonate, o-,p-nitrobenzenesulfonate, o-,p-bromobenzenesulfonate, o-,p-chlorobenzenesulfonate, o-,p-methylbenzenesulfonate, o-t-butylbenzenesulfonate, 2,5-dimethylbenzenesulfonate, 4-chloro-3-methylbenzenesulfonate, 2,4-dinitrobenzenesulfonate, 2-chloro-3,5-dinitrobenzenesulfonate, dimethyl 5-sulfoisophthalate, 3-hydroxyethoxycarbonylbenzenesulfonate, bis(2-hydroxethyl)-5-sulfoisophthalate, 4-methoxycarbonylbenzenesulfonate, 4-acetylbenzenesulfonate, 4-methoxybenzenesulfonate, 2,5-dichlorobenzenesulfonate, 2,4,6-trimethylbenzenesulfonate, 4-nitro-3-methylbenzenesulfonate, 2-nitro-3-methylbenzenesulfonate, 2-nitro-4,5-dimethoxybenzenesulfonate, 2,6-dimethylbenzenesulfonate, 2-chloro-5-nitrobenzenesulfonate, and 5-nitro-2-methylbenzenesulfonate.

10. The process of claim 1 wherein a nonionic surfactant is employed as a processing assistant.

11. The process of claim 1 wherein a free radical inhibitor is employed as a processing assistant.

12. The process of claim 1 wherein the sulfosuccinate salt has the formula

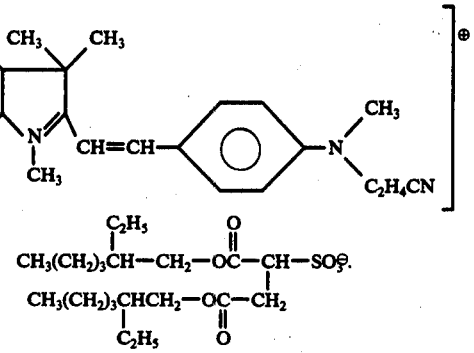

13. The process of claim 1 wherein the sulfosuccinate salt has the formula

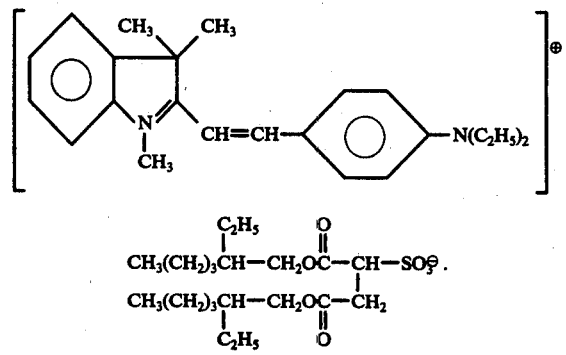

14. The process of claim 1 wherein the sulfosuccinate salt has the formula

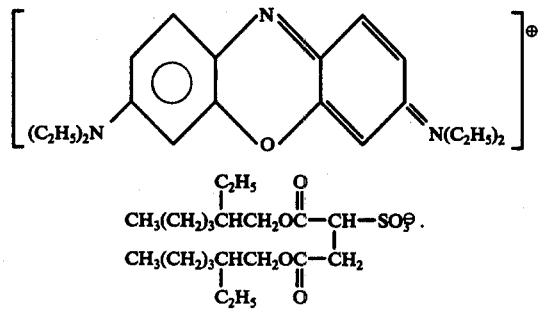

* * * * *